June 13, 1933.   E. R. ROY   1,914,296

PACKING

Filed April 13, 1932

WITNESSES
Edw. Thorpe
E. B. Marshall

INVENTOR
Ernest R. Roy
BY Munn & Co.
ATTORNEY

Patented June 13, 1933

1,914,296

UNITED STATES PATENT OFFICE

ERNEST R. ROY, OF FINDERNE, NEW JERSEY

PACKING

Application filed April 13, 1932. Serial No. 605,047.

An object of the invention is to provide an automatic packing which is inexpensive to manufacture and which is durable and efficient in operation.

Another object of the invention is to provide a packing which will grip the shaft or plunger only when leakage occurs.

Still another object of the invention is to provide a packing with a flexible lip which is pressed against the shaft or plunger by fluid pressure when leakage occurs and the shaft moves in one direction, the flexible lip being released on the return stroke of the shaft or plunger. The packing, therefore, does not depend on the tightness of the gland to compress the packing to prevent leakage. In this way excessive or unnecessary friction and wear is avoided, which increases the general efficiency of the unit in which the packing is employed. The packing also gives long, uninterrupted services, lessens maintenance cost and avoids renewal of badly worn or pitted shafts and plungers.

A further object of the invention is to provide the packing in two parts with oblique contacting wedge surfaces which makes it possible by pressing the gland to press the packing part with the lip against the shaft or plunger to take up possible wear of the lip. The lip of the packing is constructed with edges in contact with a shaft or plunger to prevent shredding.

Additional objects of the invention will appear in the following specification in which the preferred form of the invention is described.

Figure 1:
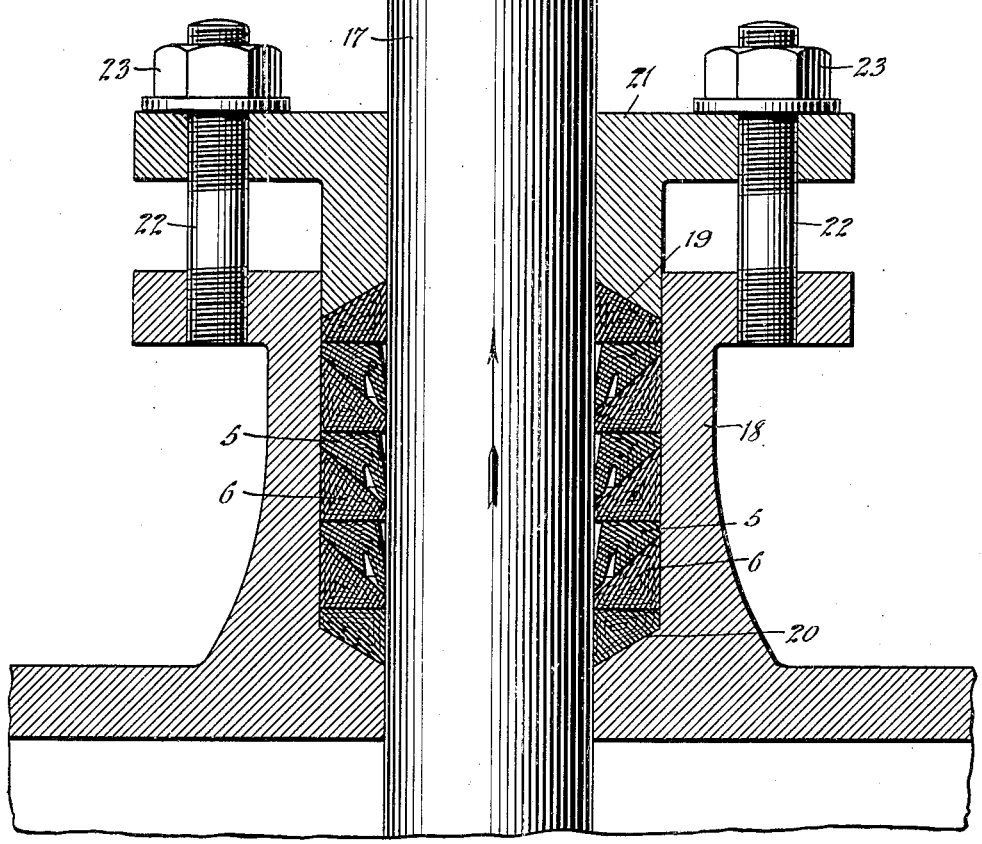
Figure 2:
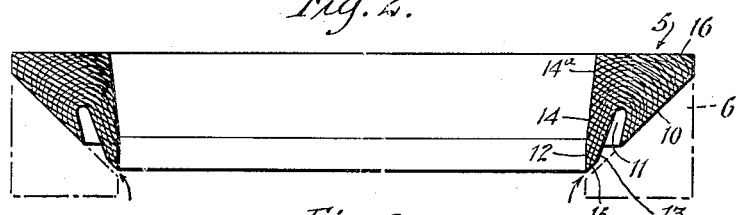
Figure 3:
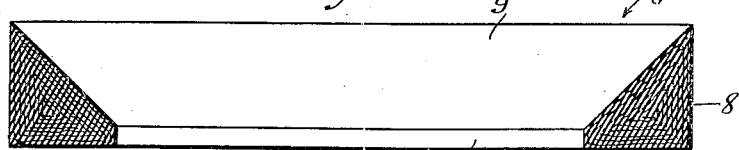

In the drawing similar reference characters refer to similar parts in the several views, of which Figure 1 is a sectional elevation of a stuffing box and its gland provided with the packing which is the subject matter of this application, Figure 2 is a transverse sectional view of one of the members of the packing, and Figure 3 is a transverse sectional view of the companion member of the packing.

By referring to the drawing it will be seen that companion annular packing members 5 and 6 are provided, it being possible to use any desired number of these pairs of packing members. The annular packing member 6 has an inner face 7 which may be substantially parallel with its outer face 8, the annular packing member 6 extending obliquely outwardly from its inner face 7 to its outer face 8 to provide an obliquely extending face 9, the said annular packing member 6 being considerably deeper at its outer face 8 than at its inner face 7. This annular packing member 6 is constructed by wrapping plies of cloth, or other material such as asbestos, cotton duck, hemp or leather, and securing the plies together in the proper form.

The companion annular packing member 5 is also constructed by wrapping plies of cloth, or other material such as asbestos, cotton duck, hemp or leather, and securing these plies together in the proper form, it being seen by referring to Figures 1 and 2 that the annular packing member 5 has an oblique face 10 for disposal against the oblique face 9 of the annular packing member 6. Extending through the oblique face 10 of the annular packing member 5 there is a cavity 11 which extends obliquely and at an acute angle relatively to the oblique face 10 of the said annular packing member 5. The inner service face 12 of the annular packing member 5 forms with the inner wall 13 of the cavity 11 an annular lip 14, the said annular lip 14 being so constructed that there will normally be a space 15 between the tip of the lip 14 and the adjacent oblique face 9 of the companion packing member 6. It will also be seen by referring to the drawing that the oblique face 9 of the annular packing member 6 beyond the lip 14 extends outwardly in the direction of the end 16 of the annular packing member 5 and is disposed against the oblique face 10 of the annular packing member 5. The inner face of the annular packing member 5 beyond the service face 12 of the annular lip 14 extends outwardly at 14ª so that it will not engage the piston or plunger 17.

The annular packing members are arranged in pairs, as illustrated in Figure 1, and it will be understood that any desired number of pairs of these annular packing members may be employed. The inner service face 12 of the annular packing member 5 is at the annular lip 14 and, inasmuch as the annular packing member 5 is constructed, as has been stated, of plies of material and as the edges of these plies of material are at the inner service face of the lip 14, which is flexible, the inner service face of the lip 14 at the said edges of the plies of material will engage the piston or plunger 17 and the edges of the plies of material engaging the piston or plunger 17 will prevent shredding.

The pair or pairs of annular packing members 5 and 6 are disposed in a stuffing box 18 between an upper packing header 19 and a lower packing header 20, a gland 21 being provided for pressing the upper packing header 19 in the direction of the lower packing header 20 in the customary manner and by means of the bolts 22 and the nuts 23.

It will be understood that, when the shaft or plunger 17 moves in the direction of the arrow in Figure 1, the piston or plunger 17 will press the flexible lips 14 on the annular packing members 5 upwardly and into close contact with the piston or plunger 17 to prevent leakage in the direction of the gland 21, any fluid which has accumulated at the annular packing members 5 and 6 passing into the cavities 11, the pressure of which will assist in holding the lips 14 against the piston or plunger 17. When the piston or plunger 17 moves in the opposite direction, there will be little friction of the flexible lips 14 against the piston or plunger 17 and any fluid which may be disposed adjacent the annular packing members 5 and 6 will be entrained in the direction of the movement of the piston or plunger 17. It will also be understood that, should there be any wear at the flexible lips 14 of the annular packing members 5, this may be taken up by tightening the gland 21, which will force the annular packing members 5 against the annular packing members 6 respectively, the oblique faces 10 and 9 of the said annular packing members 5 and 6 causing the annular packing members 5 to move inwardly to bring the annular flexible lips 14 into close engagement with the piston or plunger 17.

What is claimed is:

1. In a packing, two annular members having contacting oblique edges, one of the members having an annular cavity extending to its oblique edge, the last mentioned member having a flexible annular lip between the cavity and the inner service face of the said member, the said lip being normally spaced from the other member.

2. In a packing, two annular members having contacting oblique edges, one of the members having an inner annular flexible lip extending approximately to the oblique edge of the other member but being spaced therefrom.

3. In a packing, an annular member having an oblique edge, and a second annular member having an oblique edge contacting with the oblique edge of the first mentioned member, the first mentioned member having an inner annular lip extending approximately to the oblique edge of the second mentioned member, the inner face of the first mentioned member extending longitudinally and outwardly.

4. In a packing, an annular member having an oblique edge, and a second annular member having an oblique edge contacting with the oblique edge of the first mentioned member, there being a cavity in the first mentioned member extending through its oblique edge forming a lip between the inner face of the first mentioned member and the said cavity, the said lip being normally spaced from the oblique edge of the second mentioned member, the inner face of the first mentioned member extending longitudinally and outwardly.

ERNEST R. ROY.